United States Patent
Sollak et al.

[11] 3,943,882
[45] Mar. 16, 1976

[54] DEVICE FOR ADJUSTING AND INDICATING THE RELATIVE POSITION OF SKI BINDING COMPONENTS

[75] Inventors: Johann Sollak, Schwechat; Otto Waczek, Kaltenleutgeben, both of Austria

[73] Assignee: Gertsch AG, Zug, Switzerland

[22] Filed: June 12, 1974

[21] Appl. No.: 478,583

[30] Foreign Application Priority Data
June 19, 1973 Austria .................. 5398/73

[52] U.S. Cl. 116/124 R; 116/DIG. 11; 280/11.35 R
[51] Int. Cl.² .................. G09F 9/00; A63C 9/00
[58] Field of Search ........ 280/11.35 R; 116/124 R, 116/135, DIG. 11

[56] References Cited
FOREIGN PATENTS OR APPLICATIONS

| | | |
|---|---|---|
| 2,200,768 | 7/1972 | Germany |
| 216,538 | 7/1925 | United Kingdom .................. 33/172 |
| 245,997 | 3/1966 | Austria |
| 488,467 | 5/1970 | Switzerland |
| 2,000,095 | 7/1971 | Germany |
| 243,658 | 2/1965 | Austria |

*Primary Examiner*—Houston S. Bell, Jr.
*Assistant Examiner*—Steven L. Stephan
*Attorney, Agent, or Firm*—Woodhams, Blanchard and Flynn

[57] ABSTRACT

Indicator for safety ski binding. As a direct acting indicator for a safety ski binding a leaf spring is fixed at one end within a binding component and its other end is constrained for movement in a straight line aligned with, or at least parallel with, the direction of an applied force but is free to move along such line. Thus, the magnitude of such force determines the position of said spring and a portion of the spring may then be utilized, such as being viewed through a window, to indicate the magnitude of such force. The said force being equal or proportional to the setting of the spring opposing release of the ski binding, the position of said indicator spring will comprise an indication of the force required to release the ski binding. Different embodiments disclosed show different possible specific arrangements of indicator spring.

5 Claims, 4 Drawing Figures

3,943,882

DEVICE FOR ADJUSTING AND INDICATING THE RELATIVE POSITION OF SKI BINDING COMPONENTS

FIELD OF THE INVENTION

This invention relates to a device for adjusting and indicating the relative position of spring-controlled ski binding components wherein associated marks are provided on the ski binding components. On one component marks comprise openings provided thereon and on the other component the marks comprise surface and/or dot-shaped markings and wherein in particular three markings are used.

BACKGROUND OF THE INVENTION

A device which indicates the initial stress on the spring of a spring-loaded indicator is known from German Offenlegungsschrift No. 2,200,768. However, a disadvantage of this device is that the indication depends on the relative position of the indicator. Further, it is not possible for technical reasons to maintain the relationship between the operating and indicating end of the indicator in a relationship which is suitable for a satisfactory indication.

A different indicating device to indicate the necessary force between two coupling halves and the associated cables to release the cable lock is described in Austrian Patent No. 243,658. In this device, there is an indicating lever which moves against the force of a spring until a release finger hits the stop plate. However, the correct adjusting of this device requires much work and is time consuming.

In Swiss Patent No. 488,467 there is provided for indicating or adjusting the release force, an indicating device which comprises a jaw with a windowed hood, which hood carries the locking bolt of the lift-type locking device and further includes a scale which swings past the inside of the window, said scale being coupled with the spring clamping sleeve. According to a further development of this known construction the movement of the adjusting screw is transferred onto an indicating bar which can carry out a pivoting movement about its pivot axis. On the surface of the indicating bar, there appear the symbols or numbers which can be read through the indicating window. These symbols or numbers represent a measurement for the tension of the spring. The disadvantage of this known construction consists in that the entire indicating device must be positioned horizontally in the ski binding and due to limited space this presents design difficulty.

The objective of the present invention is to produce an indicating device which can be arranged in a space-saving manner in safety ski bindings, wherein the indicator and its operating device are themselves of maximum simplicity.

SUMMARY OF THE INVENTION

The present invention is an improvement over that of U.S. Pat. No. 3,489,122 to which reference is made.

The purpose above stated is attained according to the invention by providing the indicator as an elastic element which is supported on a movable part of the adjusting device, wherein a varying portion of the indicator moves in front of or below the markings. By this inventive construction, the indicating device can be designed in a simple and space-saving manner, wherein the desired magnification of motion is provided through the relationship between the point of abutment of the indicator onto the adjusting device and the indicating portion of the indicator.

A preferred embodiment of the invention comprises a device wherein the elastic element is secured at one of its ends onto a fixed part of the ski binding and the other of its ends is supported on the movable component of the adjusting device. Further the central zone of the elastic element is arranged in front of or below the markings as a directly operated indicator. This embodiment has the advantage that the elastic element which serves to return the indicator into the initial position is itself constructed as an indicator.

According to a further characteristic of the invention, the elastic element can be arranged parallel to the longitudinal axis of the adjusting device of the ski binding. This arrangement enables the relationship between longitudinal adjustment and indication to be particularly advantageous.

According to a still further feature of the invention, a separate indicator can be arranged in the central zone of the elastic element. This construction has the advantage of still greater magnification of the change relationship between adjusting and indicating mechanism.

A preferred form of this type comprises an elastic element arranged between the pivot point of the indicator and the support point of the indicating device on the adjusting device. This embodiment has the advantage that the elastic element can be shorter but yet the same relationships as in the preceding case can be achieved. This diminishes the expense of the indicating device.

According to a different inventive characteristic, the elastic element is secured at one of its ends on a fixed component of the ski binding and is supported with its central zone on the movable part of the adjusting device and the other, free, end comprises the indicator. This embodiment has the advantage that the elastic element can be arranged with its longitudinal extent partly parallel to the adjusting device, which enables its length and thus also the indicating relationship to remain unchanged but shortens the overall length.

According to a still different inventive characteristic, the end of the elastic element comprising the indicator, consists also of an elastic material which is constructed resiliently with reference to the first elastic element in the direction of the markings. This embodiment permits a transversely lying arrangement of the indicating device with respect to the adjusting device.

According to a further inventive thought the indicating device can for the preceding embodiment be coupled with an additional helical spring. In this case both the first elastic element and also the, if necessary, separate indicator can be made of a weak material and the helical spring can be provided alternatively as a tension or compression spring. Thus, a reliable indication is assured for both cases.

BRIEF DESCRIPTION OF THE DRAWINGS

Further details of the device of the invention will be discussed more in detail in connection with the exemplary embodiments which are illustrated in the drawings, in which.

DETAILED DESCRIPTION

Figure 1:
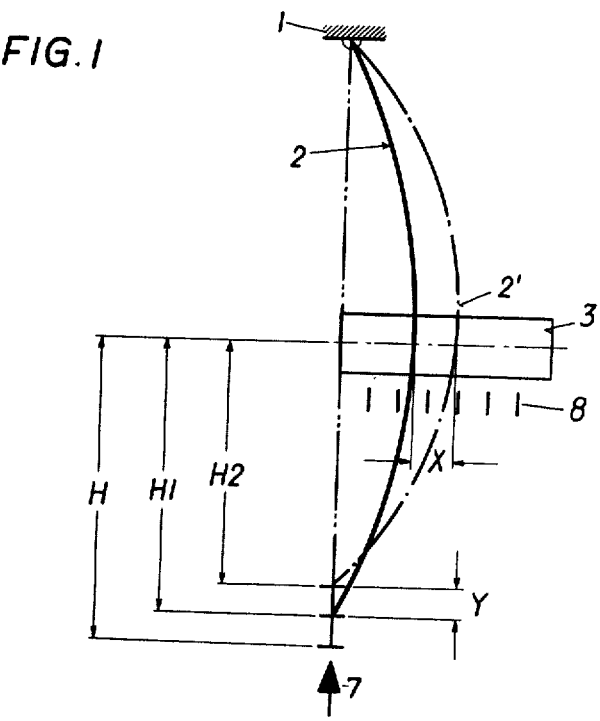
FIGS. 1 and 2 illustrate a support of a first exemplary embodiment of the invention.
Figure 2:
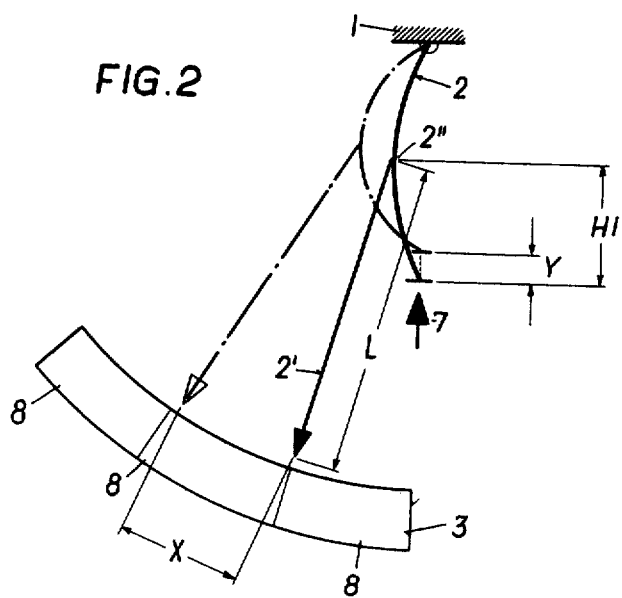

The indicating device which in FIGS. 1 and 2 is illustrated only schematically consists substantially of an elastic element, for example a leaf spring 2, which is secured in the ski binding element 1 and is supported at its free end on a movable portion of the adjusting device for adjusting the release force of such ski binding element. Said adjusting device is here indicated only by an arrow 7. If an adjustable part of the adjusting device moves in the direction of the arrow 7, the elastic element 2 reaches the position which is indicated by a dash-dotted line. The central part 2' of the elastic element 2 may thus act as an indicator which moves below the opening 3 comprising a window. The markings 8 which are exemplarily provided beside the window 3 are in a predetermined relationship to the position of the adjusting device and indicate the respective adjusting strength of the spring for the ski binding parts, namely to determine the release force. FIG. 1 clearly shows that the longer the arm H of the indicator 2, the greater the path of adjustment X of the central zone 2' of the elastic element 2 in relationship to the adjusting path Y of the adjusting device. The initial position is indicated in the figure by two point-dashed lines. The adjusting path of the indicator 2' is illustrated between two markings, namely with the length H1 or H2 of the indicator 2'.

In the embodiment according to FIG. 2, the indicator 2' is secured in the central zone 2'' of the elastic element 2. The free end of the indicator 2' moves in front of the markings 8 of the window 3. In this case the path of adjustment of the indicator 2' depends on the relationship of the arm length H1 of the elastic element 2 and L of the indicator 2', wherein also in this case for an adjusting path Y of the adjusting device there occurs a movement of the indicator 2'. Also for this case a different position of the elastic element 2 or of the indicator 2' is indicated by a dash-dotted line.

Figure 3:
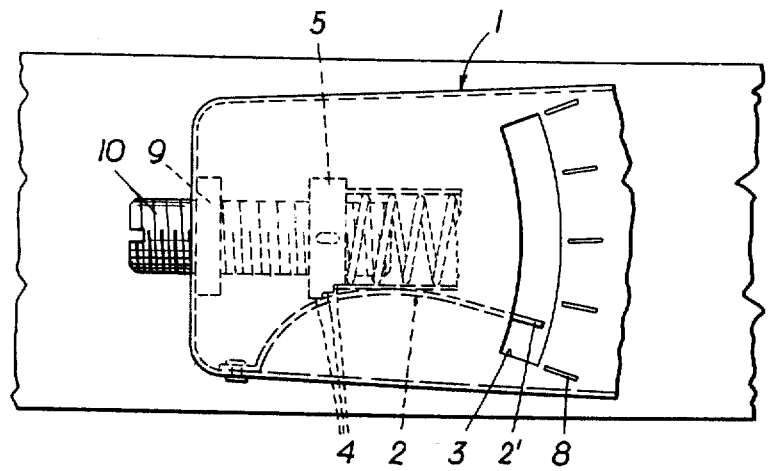
FIG. 3 is a longitudinal cross-sectional view of a ski binding with a second embodiment of the invention.

In the embodiment according to FIG. 3, an adjusting screw 10 is arranged in the ski binding 1 by means of a threaded nut 9 which is held in the ski binding 1. A ring disk 5 is fixedly wedged to the adjusting screw 10. The disk can be flat or have an inclined plane or as illustrated in the exemplary embodiment it can be provided with steps 4. The elastic element 2 is placed on the outer surface of the disk 5, which elastic element is at the same time fixedly secured at one of its ends on the ski binding element 1. The free end of the elastic element 2 serves as an indicator 2'. Same moves in front of the window 3 which is provided with markings 8. Depending on the respective position of the disk 5, the contact zone of the elastic element 2 changes and thus changes the position of the indicator 2' with respect to the window 3. Due to the construction of the outer surface of the disk 5 in an inclined or steplike manner, the various indicating values are practically independent from the support point of the elastic element 2 on the disk 5. If the outer surface of the disk 5 is constructed circularly, the markings 8 are not only calibrated for the effective path of adjustment of the adjusting screw 10, but also based on the effect of the variable position of the edge 5' of the disk 5. The calculations which are required for such lie within the general knowledge of the average man skilled in the art and therefore do not need to be described further.

Figure 4:
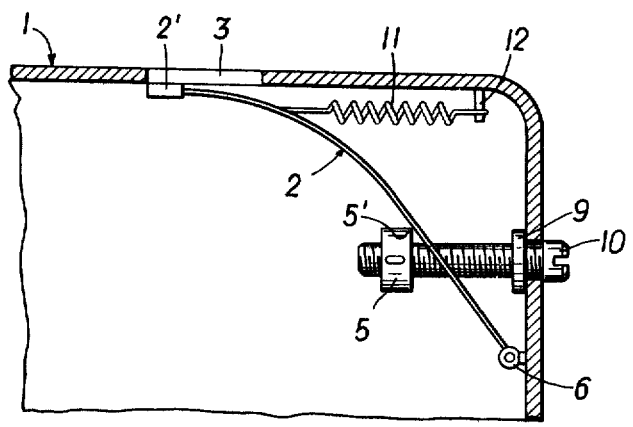
FIG. 4 is a partial cross-sectional view of a ski binding with a third exemplary embodiment.

Another exemplary embodiment is illustrated in FIG. 4, in which the elastic element 2 is secured in the ski binding 1 on a pivot point 6. The construction and securement of the adjusting screw 10 in the threaded nut 9 with the wedged-on disk 5 is done in the same manner as in the exemplary embodiment of FIG. 3. Here the elastic element 2 rests on the edge 5' of the disk 5. The indicator 2' moves below the window 3 which is arranged in the ski binding 1, the indicator 2' being connected resiliently to the elastic element 2 so that in any desired position of the elastic element 2, the indicator 2' lies on, or at least is guided parallel with, the window 3.

FIG. 4 additionally illustrates a compression spring 11 secured on a locking pin 12 which is fixedly arranged in the ski binding 1. This construction enables both the elastic element 2 and also the indicator 2' to be made of a very thin material because the indicating device is urged against the edge 5' of the disk 5 by means of the compression spring 11.

Alternatively, it is easily conceivable to make the arrangement in such a manner that the helical spring 11 comprises a tension spring positioned on the other side of the window 3.

Further constructions are possible within the scope of the invention without exceeding the scope of its protection. Thus, for example, in the first exemplary embodiments the indicator can extend from the swivel point to the window and only the distance between the pivot point and point of action be bridged by an elastic element. In this way, the elastic element may be shortened and the indicating device may be made at less cost. For the second exemplary embodiment, the flexible element could for example be limited to the zone in which it extends substantially parallel to the longitudinal axis of the adjusting screw. The mounting portion could then be made from a low-quality material. For the construction of FIG. 4, this same modification can be applied to mounting or stem end of the spring even if a separate spring is used.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. An indicator device for indicating the relative position of ski binding components, comprising:
   a ski binding element having indicia means thereon;
   adjusting means mounted on said ski binding element, said adjusting means including movable carriage means supported for movement relative to said ski binding element in response to an adjustment of said adjusting means; and
   a leaf spring secured at one end to said ski binding element and slidingly engaging at its central zone said carriage means, said leaf spring being flexed in response to a movement of said carriage means, the other end of said leaf spring being a free end which is positioned adjacent said indicia means to define an indicator and being movable in response to a flexing of said leaf spring so that a movement of said free end of said leaf spring relative to said indicia means in response to a flexing of said leaf spring will indicate said relative position of said ski binding components.

2. An indicator device according to claim 1, wherein the longitudinal axis of said leaf spring is generally parallel to the longitudinal path of movement of said carriage means.

3. An indicator device according to claim 1, wherein said leaf spring is pivotally secured to said ski binding element at said one end and is resiliently flexed into engagement with said carriage means.

4. An indicator device according to claim 1, including an additional spring for urging said leaf spring into engagement with said carriage means.

5. An indicator device according to claim 1, wherein said leaf spring is fixedly secured to said ski binding element at said one end and is resiliently flexed into engagement with said carriage means.

* * * * *